United States Patent Office 2,764,504
Patented Sept. 25, 1956

2,764,504

COATING PROCESS AND PRODUCTS THEREFROM

Henning W. Jacobson and Paul L. Salzberg, Wilmington, Del., assignors to E. I. du Pont de Nemours & Company, Wilmington, Del., a corporation of Delaware No Drawing. Application August 28, 1952,
Serial No. 306,934

8 Claims. (Cl. 117—63)

This invention relates to modified cellulose and more particularly to a new type of wholly internally modified cellulose.

Cellulose has long been a major article of commerce, primarily because of its low cost, ready availability, and the many desirable properties it possesses. For instance, cellulose of several types from many sources can be directly formed into staple fabrics and fibers of high utility in many varied fields. Examples of these types include linen, sisal, jute, hemp, and, particularly, cotton which exhibits generally good physical properties, is easily handled with cheap and convenient aqueous processing treatments, and is used therefore in most of the low cost textiles.

However, despite its desirable properties and wide utility in many fiber and fabric outlets, cellulose has some shortcomings. In particular, its elongation and work recovery are deficient for some uses. It exhibits both poor crease resistance and poor crease retention making it unsuitable for some fabric outlets. Recent synthetic fiber developments and new outlets wherein these fibers can be used, but the natural fibers cannot, have focused attention on these and other properties, particularly tensile strength, where the synthetic fibers are superior. This has served to emphasize further the desirability of so processing the cheaper, more readily available natural fibers, particularly cellulose, as to form modified products of utility in these new outlets. In addition, although cellulose exhibits reasonably good hydrophilicity for fiber and fabric use per se, it is not sufficiently good in this respect to permit blending with the largely hydrophobic, synthetic fibers to produce compositions adequately processable with the more convenient aqueous systems.

One of the recently developed and constantly expanding commercial cellulose outlets is in the sponge field. Although cellulose is quite desirable in many aspects for use in this field, the sponges prepared therefrom suffer from a lack of dimensional stability, i. e., too much shrinkage, and for many uses are not as stiff as is desired. Finally, although cellulose possesses many readily reactable points of attack in its ether and hydroxy units which permit easy, permanent, chemical modification therethrough, reactions involving such chemical "handles" are not completely desirable. For instance, any reactions involving the ether linkages may seriously disrupt the main polymer chain and thereby result in products with undesirable overall properties. In addition, many of the hydroxyl groups are hindered in their reactivity because of packing and crowding phenomena arising from the cyclic structure of the recurring units. In any event, such modifying reactions necessitate a deep-seated change in the cellulose structure itself. Accordingly, it has long been felt desirable to be able to process cellulose so as to have permanent centers or handles for chemical modification which would be inextractable and yet reactive but which would not involve during reaction any portion of the cellulose structure.

This invention has as an object the preparation of cellulose of improved properties particularly with respect to at least one of the following: elongation, work recovery, crease resistance, crease retention, and hydrophilicity. Another object is the provision of a process for attaining such results. Other objects will appear hereinafter.

These objects are accomplished by the present invention of cellulose, in any form, e. g. cotton, linen, and the like, or yarns or fabrics prepared therefrom, containing from 5 to 200% by weight of the cellulose of a wholly internally deposited vinylidene carboxamide polymer. The cellulose containing the vinylidene carboxamide polymer exhibits in undiminished form essentially all the desirable properties of cellulose, e. g. hand, texture, and feel and at the same time exhibits higher tensile strength, greater resilience as measured by higher work recoveries, better dimensional stability, greater hydrophilicity in the case of the water-soluble vinylidene carboxamide polymers, higher modulus of stiffness, particularly in sponge and filament form, and possesses permanent points for chemical modification, inextractable therefrom and in such modifying reaction not involving any of the essential cellulose structure. More specifically, it has been found that cellulose in any shape or form containing from 5 to 200% of a wholly internally deposited vinylidene carboxamide polymer, wherein the said polymer is preferably composed in major part, i. e., 50% by weight or more, of recurring vinylidene carboxamide monomer units in combined form, exhibits the desirable properties of cellulose in substantially unchanged degree and in addition is stronger, both dry and wet, exhibits higher work recovery, greater dimensional stability, higher modulus, and, in the case of the water-sensitive or water-soluble vinylidene carboxamide polymers, greater hydrophilicity, and at the same time possesses sites for permanent chemical modification of the thus treated celluloses without involving any of the cellulose linkages. In thus affording a means of obtaining modified cellulose possessing essentially all the desired properties of cellulose, some in improved degree, and at the same time certain desirable properties not possessed by cellulose, the process of this invention and the products therefrom obtained constitute important contributions to the vast and complex cellulose field.

The internal deposition of the vinylidene carboxamide polymers in cellulose can be achieved by the process of the present invention wherein the cellulose in the desired form is brought into intimate contact, e. g. by immersion, padding, or the like, with a solution of the requisite vinylidene carboxamide monomer in an inert solvent system therefor which is a non-solvent for the cellulose, said solution containing dissolved free-radical generating addition polymerization initiator, heating the mixture to the requisite temperature to effect polymerization and finally exposing the treated shaped object to a solvent or solvents for the vinylidene carboxamide polymer which is a non-solvent for the cellulose until no further polymer is extracted.

The vinylidene carboxamide monomers used in the process of this invention are simply those having hydrogen on an atom alpha to the carbonyl and carrying a single polymerizable, terminal, ethylenic unsaturation, i. e., a single vinylidene ($CH_2=C<$) group, one of the free valences of the said vinylidene group being singly bonded to one of the free valences of the single carboxamide group

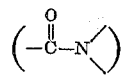

the remaining valence of the vinylidene group being satisfied by hydrogen or a monovalent organic radical, which is preferably solely hydrocarbon of no more than seven carbon atoms and most preferably saturated aliphatic hydrocarbon of no more than four carbons, with the two remaining valences of the carboxamide group being satisfied by hydrogen or similar monovalent radicals which can be together joined to form a 5 or 6-membered heterocycle. Because of the greater effect produced in the thus modified cellulose at lower levels of internally deposited polymer, the most useful vinylidene carboxamide monomers are those of the above described structure wherein the said vinylidene group is directly singly linked to the acyl carbon of the single carboxamide group, i. e., the acrylamides, including the α-, N-, or N,N- mono- or di-hydrocarbon substituted acrylamides. Of these the acrylamides having at most one hydrogen, and that on an atom alpha to carbonyl, replaced by alkyl of up to four carbons are preferred for reasons of availability, etc. Because of their more ready commercial attainability and other factors the acrylamides having two hydrogens on the acrylic carbon beta to the carbonyl, having hydrogen on an atom (nitrogen or carbon) alpha to the carbonyl and having each valence of the acrylamide nucleus not satisfied by hydrogen satisfied by a monovalent hydrocarbon radical of not more than seven carbons and preferably by an alkyl group of not more than four carbons represent the preferred group of vinylidene carboxamide monomers of use in the process of the present invention.

These vinylidene carboxamide monomers can also be described by the following structural formula:

$$A-CO-N\diagup^{B}_{\diagdown D}$$

wherein one and only one, of the units A, B, and D is a vinylidene, i. e.,

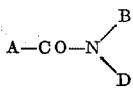

group, the remaining valence of which not satisfied by the single linkage to the single carboxamide group (—CO—N<) is filled by hydrogen or a monovalent organic radical which is preferably solely hydrocarbon, including alkyl, aryl, aralkyl, alkaryl and cycloalkyl radicals, of no more than seven carbons and most preferably by a saturated aliphatic hydrocarbon radical of no more than four carbons and the remaining two units of A, B, and D are similarly hydrogen or monovalent organic radicals which are preferably solely hydrocarbon of no more than seven carbons each and most preferably are saturated, aliphatic hydrocarbon radicals of no more than four carbons apiece, which can be together joined to form with one or both units of the carboxamide group (—CO—N<) a five- or six-membered heterocycle. It is necessary that there be a hydrogen either on the amide nitrogen or on the alpha carbon. A particularly preferred class are the vinylidene carboxamides of the above structure wherein A represents the single vinylidene group.

The vinylidene carboxamide monomers which can be employed in the process of this invention can also be described as of the structural formula —CO—N< wherein, one and only one, of the indicated free valences is satisfied by, bonded to, or connected to, the radical

wherein X is hydrogen or a monovalent organic radical which is preferably solely hydrocarbon, including alkyl, aryl, aralkyl, alkaryl, and cycloalkyl, of no more than seven carbons and is most preferably saturated aliphatic hydrocarbon of no more than four carbons and the remaining two free valences of the —CO—N< radical are each satisfied by X as above, alike or different, both of which can together be joined to form with one or both units of the said —CO—N< radical a five- or six-membered heterocycle. At least one X must be hydrogen.

A particularly preferred class are the vinylidene carboxamides of the above structure wherein the

radical is directly bonded to the acyl carbon of the carboxamide radical, i. e., compounds of the formula

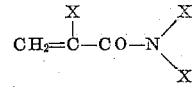

wherein the X's can be alike or different, at least one being hydrogen as defined above.

The cellulose treated in the process of this invention can be pre-swollen or not. From a convenience standpoint it is desirable not to have to pre-swell the starting material, but from a viewpoint of quicker and more thorough penetration of the vinylidene carboxamide monomer, it is desirable to use a pre-swollen cellulose where possible.

The free radical generating addition polymerization initiators used can be any of those previously known to the art provided they are soluble in the solvents being used at the concentration necessary for initiating polymerization. Suitable examples include: the oxygen-yielding peroxy and hydroperoxy initiators, e. g. the persulfates, benzoyl peroxide, and the like, with or without added reducing agents, i. e., the so-called redox systems; the azo-type initiators such as those described in U. S. 2,471,959, for instance, α,α'-azobis(γ-carboxyl-α-methyl-butyronitrile) and the like. This latter type of initiator is preferred since the former type (the oxygen-generating systems and particularly the redox systems) effect polymerization in general at too low a temperature for maximum controllability. The temperature of polymerization can vary from 0 to 150° C. or higher, with closed systems being preferably used in the temperature ranges above about 70° C. These temperatures will vary, as is true of all addition polymerizations, depending on the particular nature of both the initiator systems and the vinylidene carboxamide monomer or monomers being used. For obvious considerations of equipment, degree of control possible, and convenience, it is preferred to use those initiator systems which operate with maximum effectiveness at temperatures ranging from room temperature to 100° C. and preferably in the range 48–80° C.

Since many of the vinylidene carboxamide monomers and polymers, particularly the preferred acrylamides and the alpha hydrocarbon-substituted acrylamides, are water-soluble the monomer-treating and surface polymer removal steps in the process are usually carried out for reasons of convenience, cost, and safety in aqueous systems, the latter step being preferably at the boil. However, in some instances where the vinylidene carboxamide monomer, or more usually the polymer, or both, as in the case of methacrylanilide, are water-insoluble, aqueous systems would be of no use and organic solvent systems should be used, except that water-soluble monomers of water-insoluble polymers can be applied from aqueous systems.

Suitable solvent systems which are non-solvents for cellulose and solvents for the vinylidene carboxamide monomers, polymers and copolymers include such liquids as water; alcohols, e. g., methyl, ethyl, butyl alcohols; ketones, both cyclic and linear, e. g., cyclohexanone, methyl ethyl ketone; esters, particularly the lower aliphatic esters of the lower monocarboxylic acids, e. g., methyl, ethyl acetate, propionate; ethers, both cyclic and linear, e. g., dioxane, diethyl ether; aromatic hydrocarbons, e. g. benzene toluene the xylenes; phenols e. g., phenol, the cresols; substituted aromatic hydrocarbons, e. g., nitrobenzene, chlorobenzene; the nitroparaffins, e. g., nitromethane; the lower aliphatic monocarboxamides, e. g. formamide, dimethylformamide; halogenated hydrocarbons, e. g., chloroform, carbon tetrachloride; and mixtures thereof.

The last step in the process, i. e., the solvent extraction of the treated cellulose, after polymerization has been effected, with a solvent for the polymer involved until no further polymer is extracted, is of the upmost importance. In this step all surface polymer is removed, leaving only the internally deposited vinylidene carboxamide polymer. If this surface polymer is not all removed, appreciable and undesirable changes in the properties of the cellulose are encountered, even with relatively small quantities of surface deposited polymer. For instance, in the case of cotton fibers and fabrics, at the end of the polymerization stage these materials are stiff and boardy, ranging down to oiled silk in appearance, texture and feel. Conversely, when this surface polymer is removed by exhaustive extraction the modified cotton fibers and fabrics exhibit, among other improved properties, improved tensile strengths, higher elongations and moduli, and yet have the texture and feel of unmodified cellulose, even when containing as much as 200%, by weight of the cotton, of unextractable, wholly internally deposited vinylidene carboxamide polymer.

In this particular case, it is even more surprising that such results are obtained. For instance, while treatment of cotton fibers and fabrics with corresponding preformed vinylidene carboxamide polymers leads to products containing as high weight loadings of the polymer, these surface polymer deposits are not solvent-fast, i. e., upon treatment with a polymer solvent all the deposited polymer is removed. In contrast, the cellulose materials treated by the process of the present invention, even though the particular vinylidene carboxamide polymer is readily soluble in the polymer solvent used, upon continuous and exhaustive extraction still retain internal loadings of the carboxamide polymer as high as 200% by weight.

The following examples in which parts are by weight are illustrative of the invention.

*Example I*

A 0.505 part sample of viscose rayon yarn is swollen with water and then immersed in excess methanol twice for periods of one hour, during which the internally absorbed water is exchanged with the methanol resulting in a sample of viscose rayon yarn swollen with methanol. This swollen yarn is then immersed in a solution of 5 parts of methacrylamide, and 0.05 part of $\alpha,\alpha'$-diisobutyronitrile in 5 parts of absolute alcohol for one hour at 50–55° C. After removal of the impregnated yarn and blotting of excess surface-monomer solution, the thus surface-dried impregnated yarn is heated in a closed reactor at 70° C. for about two hours to effect polymerization. All surface polymer is then removed from the thus treated yarn by boiling in water for two hours. After drying there is thus obtained 0.531 part of a viscose rayon yarn containing 5.1% by weight of the viscose rayon (4.9% by weight of the whole) of solely internally deposited polymethacrylamide. This modified viscose yarn is, as far as can be judged by esthetic characteristics, unchanged over that of the control, i. e., there is no noticeable difference in hand, feel, or resilience. However, the modified yarn containing even as little as 5.1% of solely internally deposited methacrylamide polymer exhibits higher elongation than controls.

Another yarn sample containing 8.2% of wholly internal polymethacrylamide exhibited essentially no change in esthetic properties but exhibited markedly higher breaking strength and dry modulus over those of controls, specifically 282 g. vs. 264 g. and 81.9 g./den. vs. 65.4 g./den.

*Example II*

A 0.885 part sample of viscose rayon yarn is allowed to stand for two hours at room temperature in a solution of 1.0 part of methacrylamide in 9.0 parts of water containing 0.05 part of $\alpha,\alpha'$-azobis(isobutyramidine hydrochloride) polymerization initiator. The impregnated yarn is removed from the monomer bath and allowed to dry in air for about ten minutes, during which time most of the excess monomer solution drips off. The thus partially dried impregnated viscose yarn is then heated for sixteen hours at 75° C. in a closed reactor to effect polymerization. At the end of the polymerization, the surface polymethacrylamide is removed by careful and exhaustive washing with benzene, ethanol, and water until no further polymer is removed. After drying at 70° C. in a vacuum oven, there is thus obtained 1.081 parts of a viscose rayon yarn containing 22.2% by weight of the rayon yarn (18.2% by weight of the whole) of solely internally deposited polymethacrylamide.

The modified yarn is essentially unchanged in esthetic properties from the untreated control but exhibits slightly greater breaking strength, work recovery, and modulus than controls, respectively 266 vs. 264 g.; 14.1 vs. 13.2% from 5% elongation; and 76.6 vs. 65.4 g./den. (dry) and 6.7 vs. 4.9 g./den. (wet). It is extremely surprising in the first place that the polymethacrylamide cannot be removed by exhaustive extraction in not one but three good solvents for the polymer, and furthermore that the viscose rayon yarn apparently undergoes no change in esthetic properties, even when containing 22.2% of a polymer which in itself is best characterized as a stiff, boardy or hard resin, but does exhibit better overall physical properties.

*Example III*

A 0.504 part sample of viscose rayon yarn is impregnated at 60° C. for one hour in a solution of 10 parts of tertiary octylacrylamide, 5 parts of 2–B alcohol containing 0.1 part of $\alpha,\alpha'$-azodiisobutyramidine polymerization initiator. The sample is removed and excess surface monomer solution allowed to drip off, and the thus partially dried, impregnated yarn sample is placed in a closed reactor and heated at 75° C. over the weekend to effect polymerization. The thus treated sample is then placed in refluxing benzene for two hours until no further polymer is removed. After drying there is thus obtained a 0.586 part sample of viscose rayon yarn, containing 16.3%, by weight of the initial yarn, of solely internally deposited poly-N-tertiary octylacrylamide, which exhibits a higher dry modulus than controls.

*Example IV*

A 0.907 part sample of viscose rayon yarn is immersed in a solution of 1 part of N-isopropylacrylamide in 9 parts of water containing 0.05 part $\alpha,\alpha'$-azobis(isobutyramidine hydrochloride) polymerization initiator for three days at room temperature. At the end of this time polymerization of the amide monomer has occurred, as evidenced by the increased viscosity of solution. The thus treated yarn sample is removed and twice washed thoroughly with hot ethanol, followed by one wash in water until no further polymer is removed. After drying, there is thus obtained a 0.954 sample of viscose rayon yarn containing 5.2% by weight of the viscose rayon of solely internally deposited poly-N-isopropylacrylamide.

*Example V*

A 0.930 part sample of viscose rayon yarn is covered with a solution of 4 parts of acrylamide in 6 parts of water containing 0.05 part of $\alpha,\alpha'$-azobis(isobutyramidine hydrochloride) polymerization initiator and the mixture heated at 70° C. for sixteen hours to effect polymerization. After removal and thorough washing of the yarn in hot water until no further polymer is removed, there is thus obtained a 1.242 part (dry) sample of viscose rayon yarn containing 33.6% by weight of the starting viscose rayon yarn of wholly internally deposited polyacrylamide. The modified yarn is essentially unchanged in esthetic properties but exhibits, respectively, higher break strength, dry modulus, and work recovery than controls, specifically 312 vs. 264 g., 82.5 vs. 65.4 g./den., and 20.1 vs. 16.5% from 3% elongation.

A similar experiment carried out using a 0.931 part sample of viscose rayon yarn and a solution of 0.5 part of acrylamide in 9.5 parts of water containing 0.05 part of the same polymerization initiator leads to the production, after complete extraction of surface polymer and drying, of a 0.990 part sample of modified viscose rayon yarn containing 6.2% based on the starting viscose rayon yarn of wholly internally deposited polyacrylamide.

When a viscose rayon yarn was internally impregnated with an 80/20 methyl methacrylate/allyl glycidyl ether copolymer by the technique of Example I, benzoyl peroxide being the initiator and the polymerization being carried out over 40 hours at 75° C., to give viscose rayon yarn having a wholly internal deposit of 27%, by weight of the viscose rayon, of the copolymer and the resultant yarn compared with the product of the first part of Example V, which product has approximately the same content of polymer and with a control unimpregnated yarn, the following results were obtained:

| | Methyl Methacrylate (80) Allyl Glycidyl Ether (20) | Methacrylamide | Control (No polymer) |
|---|---|---|---|
| Denier | 188 | 195 | 151 |
| Break Strength [1] | 215 | 312 | 264 |
| Modulus, dry [2] | 65.3 | 82.5 | 65.5 |
| Work Recovery: | | | |
| from 1% elongation...percent | 44.1 | 51.0 | 53.1 |
| from 3% elongation......do.... | 12.4 | 20.1 | 16.5 |
| from 5% elongation......do.... | 10.3 | 16.0 | 13.2 |

[1] In grams.
[2] In gms./denier.

Substantially the same results as those obtained with the methyl methacrylate/allyl glycidyl ether copolymer were obtained with other vinylidene carboxylate monomers, e. g. methyl acrylate, methyl methacrylate, butyl acrylate, vinyl acetate; vinylidene halides, e. g. vinyl chloride; vinyl aryls, e. g. styrene; dienes, e. g. isoprene; and mixtures thereof.

*Example VI*

A 0.892 part sample of viscose rayon yarn is covered with a solution of 0.225 part of acrylamide, 4.225 parts of methacrylamide, in 41.5 parts of water containing 0.025 part of $\alpha,\alpha'$-azobis(isobutyramidine hydrochloride) polymerization initiator. After standing for one hour at room temperature, the mixture is heated for four hours at 70° C. to effect polymerization. The yarn is removed and washed thoroughly with warm water until no further polymer is removed. After drying there is thus obtained a 2.332 part sample of modified viscose rayon yarn containing 161% by weight of the starting viscose rayon yarn of a wholly internally deposited 95/5 methacrylamide/acrylamide copolymer.

A similar experiment using methacrylamide and acrylamide in a 60/40 ratio resulted in the formation of a modified viscose rayon yarn containing 70.5% based on the starting yarn of a wholly internally deposited 60/40 methacrylamide/acrylamide copolymer.

*Example VII*

A 17.77 part sample of viscose rayon yarn is covered with 450 parts of a solution made up from 36 parts of methacrylamide and 9 parts of acrylamide dissolved in 405 parts of water containing 0.2 part of $\alpha,\alpha'$-azobis(isobutyramidine hydrochloride) polymerization initiator and the whole maintained for two hours at room temperature and then heated for three hours at 65° C. to effect polymerization. The modified yarn sample is removed and thoroughly washed with warm water until no further polymer is removed. After drying there is thus obtained 30.7 parts of modified viscose rayon yarn containing 72.9% by weight based on the starting viscose rayon yarn of a wholly internally deposited 80/20 methacrylamide/acrylamide copolymer. The modified yarn exhibited higher break strength and work recovery and required much greater force to elongate 100% than unmodified controls: viz., respectively, 337 vs. 264 g.; 18.6 vs. 16.5% and 55.1 vs. 53.1% from 3% and 1% elongations; and 19,200 vs. 9,900 g.

*Example VIII*

A 0.874 part sample of viscose rayon yarn is covered with a solution of 0.75 part of methacrylamide and 0.75 part of 2,3-dihydroxypropyl methacrylate (glyceryl monomethacrylate) in 14.5 parts of water containing added 0.008 part of potassium persulfate polymerization initiator and the whole maintained at room temperature for one hour and then heated for four hours at 70° C. to effect polymerization. The modified yarn sample is removed and thoroughly washed with warm water until no further polymer is extracted. After drying there is thus obtained a 1.660 part sample of modified viscose rayon yarn containing 90% by weight based on the starting viscose rayon yarn sample of a wholly internally deposited 50/50 methacrylamide/2,3-dihydroxypropyl methacrylate copolymer.

The modified yarn exhibits higher breaking strength and requires a much greater force to elongate 100% than unmodified controls, viz., 316 vs. 264 g. and 17,300 vs. 9,900 g., respectively.

*Example IX*

A 3.336 part sample of a viscose rayon broadcloth fabric under slight tension on a stainless steel frame so as to maintain the fabric in flat condition is covered with a solution of 5 parts of acrylamide and 20 parts of methacrylamide in 225 parts of water containing 0.2 part $\alpha,\alpha'$-azobis(isobutyramidine hydrochloride) polymerization initiator. The whole is maintained for 45 minutes at room temperature, and then heated for two hours at 65° C. to effect polymerization. The treated fabric is removed and carefully washed with warm water until no further polymer is extracted. After drying there is thus obtained a 5.875 part sample of modified rayon broadcloth fabric containing 76.4% by weight based on the starting broadcloth fabric of a wholly internally deposited 80/20 methacrylamide/acrylamide copolymer. The modified broadcloth fabric is fuller and livelier than unmodified controls.

*Example X*

An 8.151 part sample of bleached cotton muslin fabric, flat under slight tension as in Example IX, is covered with a solution of 9.6 parts of acrylamide and 38.4 parts of methacrylamide in 432 parts of water containing 0.2 part added $\alpha,\alpha'$-azobis(isobutyramidine hydrochloride) polymerization initiator and the whole maintained for one-half hour at room temperature and then heated for three hours at 65° C. to effect polymerization. The fabric sample is then removed and washed thoroughly with warm water until no further polymer is removed. After drying there is thus obtained a 12.09 part sample of modified cotton muslin fabric containing 48.5% by weight based on the starting muslin fabric of a wholly internally deposited 80/20 methacrylamide/acrylamide copolymer.

The modified fabric is fuller and more lively and exhibits better crease resistance and recovery from creasing as well as much higher wet stiffness than controls.

*Example XI*

A 60.5 part sample of continuous filament viscose rayon fabric maintained in flat condition under slight tension as in the previous example is covered with a solution of 384 parts of methacrylamide, 96 parts of acrylamide and 4.8 parts of potassium persulfate in 11,400 parts of water. After standing for two hours at room temperature, the mixture is heated for five hours at 65° C. to effect polymerization and then allowed to stand for 14 hours at room temperature. The modified viscose rayon fabric is removed from the polymerization bath and carefully washed with warm water until no further polymer is extracted. There is thus obtained a 71.3 part sample of modified rayon fabric containing 17.8% by weight based on the starting rayon fabric, of a wholly internally deposited 80/20 methacrylamide/acrylamide copolymer. The modified fabric is livelier than controls although substantially the same in esthetic properties.

*Example XII*

A 0.957 part sample of American-Egyptian cotton slivers is scoured with an aqueous 0.5% soda ash solution, thoroughly washed with a 0.1% aqueous soap solution, carefully rinsed free of the scouring material, and finally wrapped in a cheesecloth bag. The washed and scoured slivers are then covered with a solution of 2 parts of acrylamide and 18 parts of methacrylamide in 180 parts of water containing 0.1 part of $\alpha,\alpha'$-azobis(isobutyramidine hydrochloride) polymerization initiator. The mixture is allowed to stand for two hours at room temperature and then heated for four hours at 65° C. to effect polymerization. After removal from the polymerization solution and careful washing with warm water until no further polymer is extracted, there is thus obtained a 2.260 part sample (dry) of modified cotton slivers containing 136% by weight, based on the weight of the starting slivers, of a wholly internally deposited 90/10 methacrylamide/acrylamide copolymer.

*Example XIII*

A 7.865 part sample of cellulose sponge is covered with a solution of 6 parts of acrylamide and 24 parts of methacrylamide in 270 parts of water containing 0.2 part of $\alpha,\alpha'$-azobis(isobutyramidine hydrochloride) polymerization initiator. The mixture is allowed to stand for three days at room temperature and is then heated for three hours at 65° C. to complete polymerization. The treated sponge is then removed from the monomer solution and carefully washed with warm water until no further polymer is extracted. There is thus obtained a 13.703 part sample of modified cellulose sponge containing 74% by weight, based on the weight of the starting sponge, of a wholly internally deposited 80/20 methacrylamide/acrylamide copolymer. The modified sponge exhibits a slightly higher water uptake (10.8 g. vs. 10.5 g.); shrinks much less on drying after total water saturation (21.8% vs. 51.7%); and is much firmer and accordingly better to handle when wet than controls.

*Example XIV*

A 1.148 part sample of porous cellulose filter paper is covered with a solution of 1 part of acrylamide and 9 parts of methacrylamide in 90 parts of water containing 0.1 part of $\alpha,\alpha'$-azobis(isobutyramidine hydrochloride) polymerization initiator and the mixture then held for two hours at room temperature and finally heated for three hours at 65° C. to effect polymerization. The modified paper is removed from the monomer solution and carefully washed with warm water until no further polymer is extracted. There is thus obtained a 1.743 part sample of modified cellulosic paper containing 52% by weight based on the starting paper of a wholly internally deposited 90/10 methacrylamide-acrylamide copolymer. The modified paper is thicker and stiffer than controls.

*Example XV*

A 1 mil thick cellophane sheet is covered with a solution of 2 parts of acrylamide and 8 parts of methacrylamide in 40 parts of water containing added 0.05 part of $\alpha,\alpha'$-azobis(isobutyramidine hydrochloride) polymerization initiator and the mixture allowed to stand for two hours at room temperature and finally heated for three hours at 65° C. to effect polymerization. The modified cellophane is then removed from the monomer mixture and thoroughly washed with warm water until no further polymer is extracted. The modified cellophane film is now 3 mils in thickness, showing a heavy incorporation of vinyl polymer.

The present invention is generic to the internal deposition, wholly within cellulose, of from at least 5% to as much as 200% by weight based on cellulose of vinylidene carboxamide addition polymers. For reasons of better overall properties and lower cost those products containing 5 to 150% of the wholly internal vinylidene carboxamide polymers are preferred. Particularly outstanding because of their greater average improvement are the products containing 5–50% wholly internal vinylidene carboxamide polymer. These polymers contain in combined form a plurality of recurring vinylidene carboxamide groups having hydrogen on an atom alpha to the carbonyl, by which is meant those monomers containing a single vinylidene ($CH_2=C<$) group per molecule singly bonded through one of the free valences to one of the free valences of the carboxamide ($—CO—N<$) group, i. e., vinylidene formamides having one of the hydrogens of formamide replaced by the vinylidene group and having hydrogen on an atom alpha to the carbonyl. Suitable examples of such polymers are those vinylidene formamides having hydrogen on an atom alpha to the carbonyl wherein the single vinylidene group is bonded to the acyl carbon of the formamide with the remaining two free valences of the formamide not satisfied by hydrogen satisfied by hydrocarbon radicals of no more than 7 carbons each which may together be joined to form, with the nitrogen of the carboxamide, a heterocycle and the remaining free valence of the vinylidene group is satisfied by hydrogen or similar hydrocarbon radicals which may be alkyl, aryl, aralkyl, alkaryl, or cycloalkyl in nature. The invention thus includes the employment of such vinylidene formamides as acrylamide, N-ethylmethacrylamide, N-propylethacrylamide, 1-acrylylpiperidine, 4-acrylylmorpholine, N-phenylacrylamide (acrylanilide), N-$\alpha$-dibenzylacrylamide, N-cyclohexylmethacrylamide, and the like.

Another class of vinylidene formamides which can be employed in the process of this invention are those wherein the single vinylidene group is directly singly bonded to the amide nitrogen of the formamide and the remaining two free valences of the carboxamide, $—CO—N<$, group are satisfied by hydrogen or hydrocarbon, e. g. alkyl, aryl, aralkyl, alkaryl, or cycloalkyl, radicals which hydrocarbon radicals may together be joined to form with the carboxamide radical a heterocycle, and the remaining free valence on the 1-carbon of the vinylidene group is similarly satisfied by hydrogen or like hydrocarbon radicals, provided always that there is hydrogen on an atom alpha to the carbonyl, for example, N-vinylformamide, N-vinyl-N-methylacetamide, N-vinylbenzamide, N-methyl-N-vinylformamide, N-vinylcyclohexanecarboxamide, N-vinyl-C-phenylacetamide, N-vinylpyrrolidone, and the like.

Because of their readier availability and greater convenience in the process of this invention, the vinylidene carboxamides wherein the single vinylidene group is directly singly bonded to the acyl carbon of the carboxamide radical are preferred. A particularly outstanding class of these preferred vinylidene carboxamides, i. e., the acrylamides, have hydrogen on an atom alpha to the carbonyl and have on the 1-carbon of the vinylidene group, i. e., the one directly linked to the acyl carbon, and the carboxamide nitrogen hydrogen or lower hydrocarbon radicals free of aliphatic unsaturation and generally of less than 6 carbons each with the two radicals directly bonded to the carboxamide nitrogen forming if desired with the said nitrogen a heterocycle. The most preferred acrylamides are those having hydrogen on an atom alpha to the carbonyl wherein the substituents on the alpha-carbon and the amide nitrogen are hydrogen or solely saturated aliphatic hydrocarbon radicals of no more than three carbons apiece, with the total number of carbons in all three such substituents per molecule not exceeding six carbons since such polymers lead to greater hydrophilicity in the modified products.

In the foregoing the internally deposited polymers have been generically referred to as vinylidene carboxamides, thus including vinylidene carboxamide polymers containing in combined form polymerizable ethylenically unsaturated monomers other than the vinylidene carboxamide type in amounts as high as 90% of the polymers. Preferably the internally deposited polymers will predominate in, i. e., contain, in combined form, at least 50% of, vinylidene carboxamide monomer units since such polymers result in modified products of better overall properties. Because of the more desirable properties conferred on the modified cellulose, e. g. greater strength, higher modulus and generally better work recovery, the preferred compositions of the present invention contain internally deposited vinylidene carboxamide polymers wherein at least 75% and more preferably at least 80% of the recurring units in the polymer are combined vinylidene carboxamide units.

The other polymerizable monomers which can be used in preparing the products of this invention, i. e., which can be present in combined form in the internally deposited predominantly vinylidene carboxamide polymers, include the polymerizable ethylenically unsaturated monomers in general, e. g., the mono- and diene monomers, by now well known in the polymerization art, e. g., ethylene, butadiene and the hydrocarbon substituted and negatively substituted derivatives thereof, e. g., styrene, chloroprene, acrylic acid, and the like. Preferred among these ethylenically unsaturated polymerizable monomers are those containing a single ethylenic group, and that terminal, i. e., the vinylidene monomers containing a single $CH_2=C<$ group. Particularly preferred are those vinylidene monomers wherein at least one of the indicated free valences is bonded directly to a negative group, e. g., the vinylidene halides, e. g., vinylidene chloride, vinyl chloride; the vinylidene esters, e. g., vinyl acetate, vinyl propionate, and the like; the esters of terminal methylenic acids, e. g., methyl acrylate, glyceryl methacrylate, and the like.

While the process has been illustrated in its application to viscose rayon yarn and fabrics therefrom, cotton slivers and fabrics, paper, cellulose sponge, and regenerated cellulose film, the process of this invention is generic in its application to cellulose including also native cotton, processed cotton in staple yarn and fabrics; regenerated cellulose in film, staple, continuous filament, and fabric form, cellulose pulp, etc. While the process is applicable to wood it shows forth its advantages best in its application to cellulose in attenuated form, i. e., film or fiber, including sponge, since the latter is essentially fibrous in construction. The cellulose material should be swellable with water and obviously should be free from polymerization inhibitors.

The products of this invention, i. e., cellulose containing from 5% to 200% solely, internally deposited vinylidene carboxamide polymer exhibit not only appreciably greater strength, higher moduli, and greater dimensional stability, but also lose their absorbed water at a much lower rate on air-drying (a property of high importance in many mill operations). These new products also exhibit markedly higher wet stiffness values and require much greater, e. g., 200% or more higher, force to elongate 100%—properties of importance in many industrial outlets. In fabric form these new products are fuller and livelier than controls. The products of this invention are thus completely different from control samples of the cellulose derivatives containing no internal vinylidene carboxamide polymer or even from those containing wholly internal deposits of other vinylidene polymers.

The extreme change in properties obtained with the wholly internally deposited vinylidene carboxamide polymers is surprising, particularly when it is recognized that this result is achieved by treating cellulose with a vinylidene monomer under conditions such as to effect polymerization without undesirable changes in esthetic properties such as in hand, drape, or feel. Even at the higher levels of internal polymer deposition, e. g., 170% or more, the products in fiber or fabric form surprisingly exhibit no visible filamentary differences except an increase in bulk over controls. Each filament remains discrete and unchanged in order with relation to the others; whereas prior treatment of cellulose materials with vinylidene monomers and polymers clearly and appreciably changed the desirable overall characteristics of the materials. See for example the increase in stiffness and water-resistivity of cellulose and cellulose derivatives obtained by treatment (U. S. 2,406,453) with vinylidene monomers or polymers.

The foregoing detailed description has been given for clearness of understanding only and no unnecessary limitations are to be understood therefrom. The invention is not limited to the exact details shown and described for obvious modifications will occur to those skilled in the art.

What is claimed is:

1. The process for the treatment of cellulose articles having one dimension large with respect to another wherein the cellulose article is impregnated with a vinylideneformamide monomer containing only hydrogen, one nitrogen, one oxygen, up to six carbons, and one carbon carbon unsaturation and having hydrogen on an atom alpha to the carbonyl, said monomer is polymerized in situ and the surface polymer is removed by extraction with a solvent for the polymer, non-solvent for the treated cellulose, whereby a cellulose article containing wholly internally deposited vinylideneformamide polymer is obtained.

2. The process for the treatment of cellulose fabrics wherein the cellulose fabric is impregnated with a vinylideneformamide monomer containing only hydrogen, one nitrogen, one oxygen, up to six carbons, and one carbon carbon unsaturation and having hydrogen on an atom alpha to the carbonyl, said monomer is polymerized in situ and the surface polymer is removed by extraction with a solvent for the polymer, non-solvent for the treated cellulose, whereby a cellulose fabric containing wholly internally deposited vinylideneformamide polymer is obtained.

3. The process for the treatment of cellulose fabrics wherein the cellulose fabric is impregnated with a monomer composition the polymerizable monomer portion of which is selected from the class consisting of acrylamide and methacrylamide, the monomer is polymerized in situ and the surface polymer is removed by extraction with a solvent for the polymer, non-solvent for the treated cellulose, whereby a cellulose fabric containing wholly internally deposited polymer is obtained.

4. The process for the treatment of cellulose fabrics wherein the cellulose fabric is impregnated with a monomer composition the polymerizable components of which consist of acrylamide and methacrylamide said monomers are polymerized in situ and the surface copolymer is removed by extraction with a solvent for the copolymer, non-solvent for the treated cellulose, whereby a cellulose fabric containing wholly internally deposited acrylamide/methacrylamide is obtained.

5. Cellulose in attenuated form as produced by the process of claim 1 and having a wholly internal deposit of vinylideneformamide polymer the units of which are the units of a vinylideneformamide monomer containing only hydrogen, one nitrogen, one oxygen, up to six carbons, and one carbon carbon unsaturation and having hydrogen on an atom alpha to the carbonyl.

6. A cellulose fabric as produced by the process of claim 2 and having a wholly internal deposit of vinylideneformamide polymer the units of which are the units of a vinylideneformamide monomer containing only hydrogen, one nitrogen, one oxygen, up to six carbons, and one carbon carbon unsaturation and having hydrogen on an atom alpha to the carbonyl.

7. A cellulose fabric as produced by the process of claim 3 and having a wholly internal deposit of vinylidene formamide polymer the units of which are selected from the class consisting of acrylamide and methacrylamide.

8. A cellulose fabric as produced by the process of claim 4 and having a wholly internal deposit of an acrylamide/methacrylamide copolymer.

References Cited in the file of this patent

UNITED STATES PATENTS

| | | |
|---|---|---|
| 2,118,036 | Booty et al. | May 24, 1938 |
| 2,314,968 | Bestian et al. | Mar. 30, 1943 |
| 2,343,095 | Smith | Feb. 29, 1944 |
| 2,406,454 | Charlton | Aug. 27, 1946 |
| 2,415,564 | Radford et al. | Feb. 11, 1947 |

FOREIGN PATENTS

| | | |
|---|---|---|
| 475,671 | Great Britain | June 2, 1937 |
| 970,791 | France | Jan. 9, 1951 |

OTHER REFERENCES

J. Society Dyers & Colorists, vol. 67 of 1951, pp. 338–344.